July 23, 1957   V. WEBER ET AL   2,800,284
CONTROL AND INDICATING DEVICE FOR FLUID FUEL BURNERS
Original Filed Sept. 3, 1952
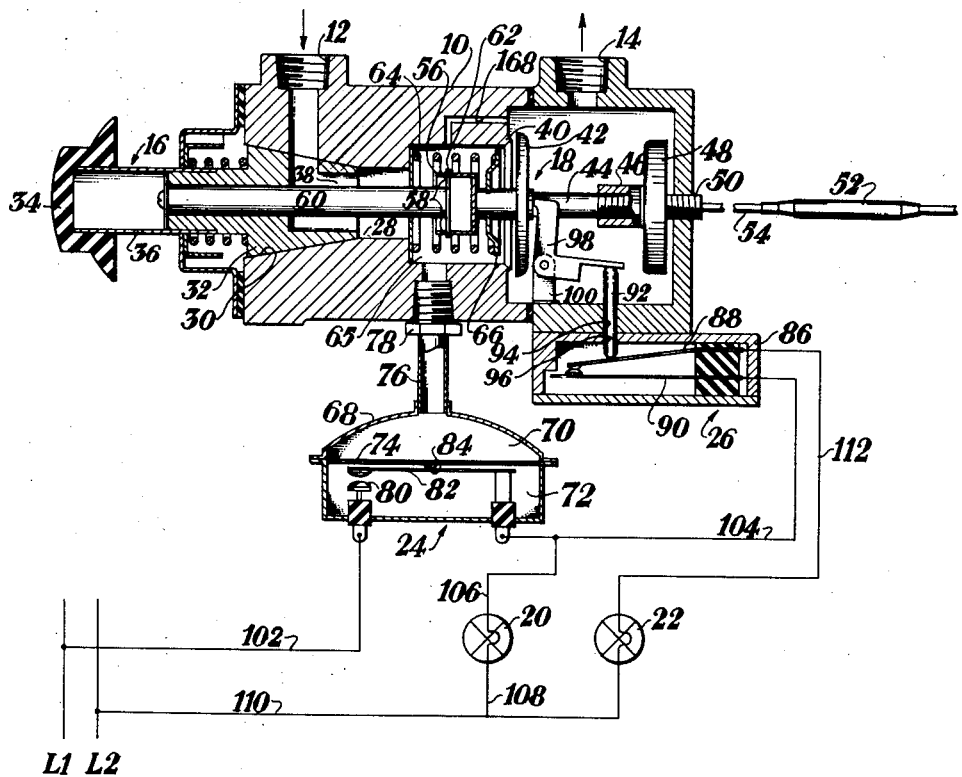
INVENTORS
Victor Weber and Russell F. Garner
BY
THEIR ATTORNEY United States Patent Office 2,800,284
Patented July 23, 1957

2,800,284

CONTROL AND INDICATING DEVICE FOR FLUID FUEL BURNERS

Victor Weber, Greensburg, and Russell F. Garner, Youngwood, Pa., assignors to Robertshaw-Fulton Controls Company, Greensburg, Pa., a corporation of Delaware Original application September 3, 1952, Serial No. 307,608. Divided and this application March 25, 1955, Serial No. 496,789

1 Claim. (Cl. 236—94)

This application is a division of our application Serial No. 307,608, filed September 3, 1952.

This invention relates generally to control apparatus for fluid fuel burners wherein an indicating device is utilized to manifest conditions of a controlling device. More specifically, the invention relates to apparatus for indicating the relative position of one or more valves controlling fuel flow to fluid fuel burners.

It is a principal object of this invention to indicate when a desired temperature condition is achieved.

Another object of this invention is to indicate when a control device is conditioned to control a temperature condition.

Another object of this invention is to indicate the position of a valve member inside a valve casing by means visible exteriorly of the casing.

Another object of this invention is to control an electrical indicating device by a pair of switches respectively connected to a manually operable valve and a thermally responsive valve arranged to control fuel flow to a burner.

In the preferred embodiment of the device, a suitable pressure switch is connected with a chamber on the upstream side of a thermostatic valve and is movable between open and closed positions in response to the pressure in said chamber. A second switch is operatively connected to the thermostatic valve to be moved between open and closed positions in response to movement of said valve. Circuit means connect the switches to a pair of indicating lamps which indicate various controlling positions of the thermostatic valve and the second manually operable valve.

Other objects and advantages will appear from the following specification taken in connection with the accompanying drawing which is a schematic showing of a control system embodying this invention.

Referring more particularly to the drawing, the control and indicating system is shown as comprising a valve casing 10 having an inlet 12 adapted for connection to a source of fluid fuel, and an outlet 14 adapted for connection to a fluid fuel burner. A manually operable valve 16 and a thermally responsive valve 18 are disposed in the casing 10 and control fluid flow between the inlet 12 and the outlet 14. Electrical indicating means, here shown as a pair of incandescent lamps 20, 22, are connected to a source of electrical energy, line wires L1, L2, and energization thereof is controlled by a pair of switches 24, 26. The switch 24 is arranged to be operated by the manually operable valve 16 and the switch 26 is arranged to be operated by the thermally responsive valve 18.

As shown in the drawing, the casing 10 is provided with an axially extending passage 28 which communicates with the inlet 12 and the outlet 14. The manually operable valve 16 is positioned at one end of the passage 28 and comprises a tapered valve seat 30 which cooperates with a tapered plug valve member 32 to close the end of the passage 28. The plug valve member 32 is adapted to be rotated relative to the seat 30 by a manually operable handle 34 carried by a stem 36 which is secured to the plug valve member 32 by any suitable means. The plug valve member 32 is provided with an angular passage 38, one end of which is adapted to register with the passage 28 in the casing 10 in all positions of the plug valve member 32. The other end of the passage 38 registers with the inlet 12 in one position of the plug valve member 32 and is out of registry with the inlet 12 in another position thereof. It will thus be apparent that rotation of the handle 34 will move the plug valve member 32 between fuel flow preventing and fuel flow permitting positions.

The thermally responsive valve 18 is positioned within the casing 10 at the outlet end of the passage 28 and comprises an annular valve seat 40 with a valve disc 42 movable toward and away from the seat 40. The valve disc 42 is secured at a medial point to a valve stem 44, one end of which is threaded into a tapped fitting 46 carried by the movable end wall of an expansible collapsible thermal power unit 48. The power unit 48 is securely mounted on a wall of the casing 10 by means of a hollow stud 50 carried thereby and threaded through the wall of the casing 10. A bulb 52, adapted to be located to respond to the temperature being controlled, is connected to the power unit 48 by a capillary tube 54. This thermal control assembly comprising the bulb 52, capillary tube 54 and power unit 48 is filled with a liquid which, upon changes in temperature sensed by the bulb 70, will serve to expand and contract the power unit 48 as is well known to those skilled in the art.

The other end of the valve stem 44 carries a cup-shaped element 56 which is provided with a pair of diametrically opposed axially extending slots 58. Disposed in the passage 28 is a shaft 60 having one end secured to the plug valve member 32 and carrying on the other end thereof a transversely extending pin 62. The ends of the pin 62 are slidably received in the slots 58 of the cup-shaped element 56 to provide a slidable, torque transmitting connection between the shaft 60 and the valve stem 44.

The hereinbefore described connection between the manually operable valve 16 and the thermally responsive valve 18 is conventional. With such an arrangement, rotation of the handle 34 not only actuates the plug valve member 32 but also transmits torque to the valve stem 44 to screw the same into or out of the tapered fitting 46 thereby adjusting the position of the valve disc 42 relative to the power element 48 and setting the temperature at which the valve disc 42 will be moved into engagement with the valve seat 40.

The valve seat 42 is biased away from the valve seat 40 by means of a spring 64 which is positioned in a chamber 65 formed in the passage 28 to act between the casing 10 and a collar 66 connected to the valve stem 44 between the cup-shaped element 56 and the valve disc 42.

As shown in the drawing the switch 24 comprises a housing 68 with the interior thereof divided into a pair of chambers 70, 72 by a flexible sealing device or diaphragm 74. The housing 68 is mounted on the casing 10 by a suitable nipple 76 and fitting 78, the nipple and fitting defining a passage maintaining communication between the chamber 70 in the housing 68 and the chamber 65 in the passage 28.

A switch comprising a fixed contact 80 and a movable contact 82 is mounted on the housing 68 within the chamber 72 with the contact 80 and the contact 82 connected to a suitable circuit later to be described. The movable contact 82 is normally spaced from the fixed contact 80 and is engageable by a thrust element 84 carried on the diaphragm 74 to be moved into engagement with the contact 80 in response to a pressure within the chamber 70.

It can be seen that if the valve 32 is rotated from an "off" to an "on" position as shown, the pressure within the chamber 70 will increase as a result of the pressure of the fuel upstream of the valve disc 42 in the chamber 65. This increase in pressure is sufficient to cause movement of the diaphragm 74 and closing of the contacts 80, 82. Thus, the switch 24 will indicate the position of the valve 32.

The switch 26 may comprise a housing 86 mounted on the casing 10 and containing a pair of flexible contact arms 88, 90 having an inherent bias which normally holds them out of engagement with each other. An operating stem 92 is slidably mounted in aligned bores 94, 96 formed in the casing 10 and the housing 86 respectively. One end of the operating stem 92 extends into the interior of the housing 86 and into engagement with the contact arm 88. The other end of the operating stem 92 extends into the interior of the casing 10 and into engagement with one end of a bellcrank lever 98 which is pivotally mounted on a bracket 100 carried by the casing 10. The other end of the bellcrank lever 98 engages the valve disc 42 and is maintained in abutting relation therewith by the inherent bias of the contact arm 88 transmitted by the operating stem 92.

Movement of the valve disc 42 toward and away from the valve seat 40 will cause the bellcrank lever 98 to rock about its pivot and impart a reciprocating motion to the operating stem 92 to thereby move the contact arm 88 into and out of engagement with the contact arm 90. The length of the operating stem 92 is such that the contact arm will be maintained out of engagement with the contact arm 90 when the valve disc 42 is in engagement with the valve seat 40. Thus, the switch 26 will be open when the thermally responsive valve 18 is positioned to prevent fuel flow to the outlet 14 and will be closed when the thermally responsive valve 18 is positioned to permit such flow.

The indicating lamps 20, 22 are connected in parallel circuit and this circuit is connected across line wires L1, L2 through the switch 24. The switch 26 is connected in series with the lamp 22. The details of the connecting circuits will be brought out more fully in the description of the operation of the apparatus which now follows.

Assume that the manually operable valve 16 is in fuel flow preventing position. In such position of the valve 16, no fuel will be permitted to flow to the thermostatic valve 18 and thus the pressure within the chamber 70 of the switch 24 will be less than that necessary to cause engagement of the contacts 80, 82. In this position the switch 24 maintains an open circuit between the indicating lamps 20, 22 and the line wires L1, L2.

To place the device in operative condition, the handle 34 is manipulated to rotate the plug valve member 32 to its fuel flow permitting position and to set the thermally responsive valve 18 to respond to a predetermined temperature. Such manipulation of the handle 34 will permit flow of fuel to the upstream side of the valve 18 by the passage 38. The pressure in the chamber 65 upstream of the valve 18 will now be greater than before and sufficient to cause movement of the diaphragm 74 of the switch 24 which causes engagement of the contacts 80, 82. Such closing of the switch 24 completes the circuit through the lamp 20 which may be traced as follows: from line L1 to wire 102, contact 80, contact 82, wire 104, wire 106, lamp 20, wire 108 and wire 110 to line wire L2. Lamp 22 which is connected in parallel with lamp 20 is also energized through a circuit which may be traced as follows: Line wire L1, wire 102, contacts 80, 82, wire 104, through contact arm 90 of the switch 26, contact arm 88, wire 112, and lamp 22 to wire 110 and line wire L2. Lamps 20, 22 are thus both energized and illumination thereof indicates that both the manually operable valve 16 and the thermally responsive valve 18 are open.

As the temperature being controlled approaches a predetermined limit, the valve disc 42 is moved toward the valve seat 40 thereby permitting the contact arm 88 to move under its bias out of engagement with the contact arm 90. The contact arms 88, 90 preferably separate as the disc 42 is about to contact the valve seat 40 thereby breaking energizing circuit for lamp 22. The lamp 22 thus ceases to produce a light and thus provides an indication that the desired temperature condition has been achieved. It is to be noted however that the lamp 20 remains energized to indicate the apparatus is in operation.

Although a preferred embodiment of this invention has been shown and described herein, it is to be understood that the invention is not limited to the details of construction and arrangement of parts disclosed but is to be interpreted as claimed.

It is claimed and desired to secure by Letters Patent:

In a control and indicating system for a fluid fuel burner having a source of electrical energy, the combination comprising a casing having an inlet passage for connection to a source of fluid fuel and an outlet passage for supplying fuel to the burner, a valve seat intersecting said passages, a valve member movable axially into and out of engagement with said seat for controlling flow of fuel to the burner, means for actuating said valve member relative to said seat in response to variations in a temperature condition, a tapered shut-off cock rotatably mounted in said casing between said valve seat and said inlet for controlling the flow of fuel to said valve seat, said shut-off cock having an open position to permit the flow of fuel to said seat and a closed position for preventing flow of fuel to said seat, first and second indicating lamps connected in parallel circuit for indicating the positions of said shut-off cock and said valve member respectively, a hollow switch housing having an extending tubular portion threaded within said casing to establish communication between said inlet passage downstream of said shut-off cock and the hollow interior of said switch housing, a pair of switch contacts positioned within said housing and connected in series with said source and said parallel circuit for controlling energization of said circuit and said first lamp, a flexible diaphragm positioned within said housing and movable in response to an increase in pressure downstream of said shut-off cock caused by rotation of said shut-off cock to its said open position, a switch arm operatively engaging said diaphragm and carrying one of said contacts to actuate the same into operative engagement with the other of said contacts to energize said parallel circuit and said first lamp in response to said movement of said diaphragm, a second switch housing attached to said casing, a pair of switch contacts in said second housing and connected in series with said second lamp to control energization of the same, a second switch arm carrying one contact of said second pair for actuating the same into and out of operative engagement with the other contact of said second pair, and a lever arm operatively connected to said second switch arm and said valve member for actuating said second switch arm to move said contact carried thereby into operative engagement with said other contact in response to movement of said valve member to a predetermined position.

References Cited in the file of this patent

UNITED STATES PATENTS

| 1,177,857 | Gilbert | Apr. 4, 1916 |
| 1,770,365 | Willis | July 8, 1930 |
| 2,006,882 | Cleveland | July 2, 1935 |
| 2,197,473 | Jackson | Apr. 16, 1940 |
| 2,237,577 | Ray | Apr. 8, 1941 |
| 2,361,530 | Burch | Oct. 31, 1944 |
| 2,641,750 | Evans | June 9, 1953 |

FOREIGN PATENTS

| 344,641 | Great Britain | Mar. 12, 1931 |
| 546,591 | France | Aug. 28, 1922 |